United States Patent [19]
Adachi et al.

[11] Patent Number: 5,784,458
[45] Date of Patent: Jul. 21, 1998

[54] TELEPHONE HAVING A HOLD FUNCTION

[75] Inventors: Shizuo Adachi, Kanagawa; Junko Hirata; Hiroshi Miyamoto, both of Chiba, all of Japan

[73] Assignee: Sony Corporation, Tokyo, Japan

[21] Appl. No.: 818,085

[22] Filed: Mar. 14, 1997

Related U.S. Application Data

[63] Continuation of Ser. No. 347,015, Nov. 30, 1994, abandoned.

[30] Foreign Application Priority Data

Nov. 30, 1993 [JP] Japan ................................. 5-300431

[51] Int. Cl.⁶ ........................................................ H04M 1/00
[52] U.S. Cl. .................. 379/435; 379/428; 379/436; 379/424; 379/425
[58] Field of Search ............................ 379/421, 422, 379/424, 425, 434, 435, 428, 436, 447, 449, 164, 165

[56] References Cited

U.S. PATENT DOCUMENTS 2,428,593  10/1947  Teague et al. ........................ 379/424
3,413,423  11/1968  Stevko ................................. 379/424
4,998,275  3/1991  Braunstein et al. .................. 379/164

FOREIGN PATENT DOCUMENTS 1-311653  12/1989  Japan ................................... 379/449

Primary Examiner—Jack Chiang
Attorney, Agent, or Firm—Harold T. Fujii; Jerry A. Miller

[57] ABSTRACT

A telephone includes a telephone body, a handset and a telephone network line hold mechanism. The telephone body includes a handset cradle on which the handset is placed, a plurality of operation buttons and the like. The telephone is placed in the offhook state when the user lifts the handset from the handset cradle and placed in the on-hook state when the user places the handset on the handset cradle. The telephone network line hold mechanism is energized when the user places the handset on the telephone body at its position in which the offhook state of the telephone is retained.

13 Claims, 12 Drawing Sheets

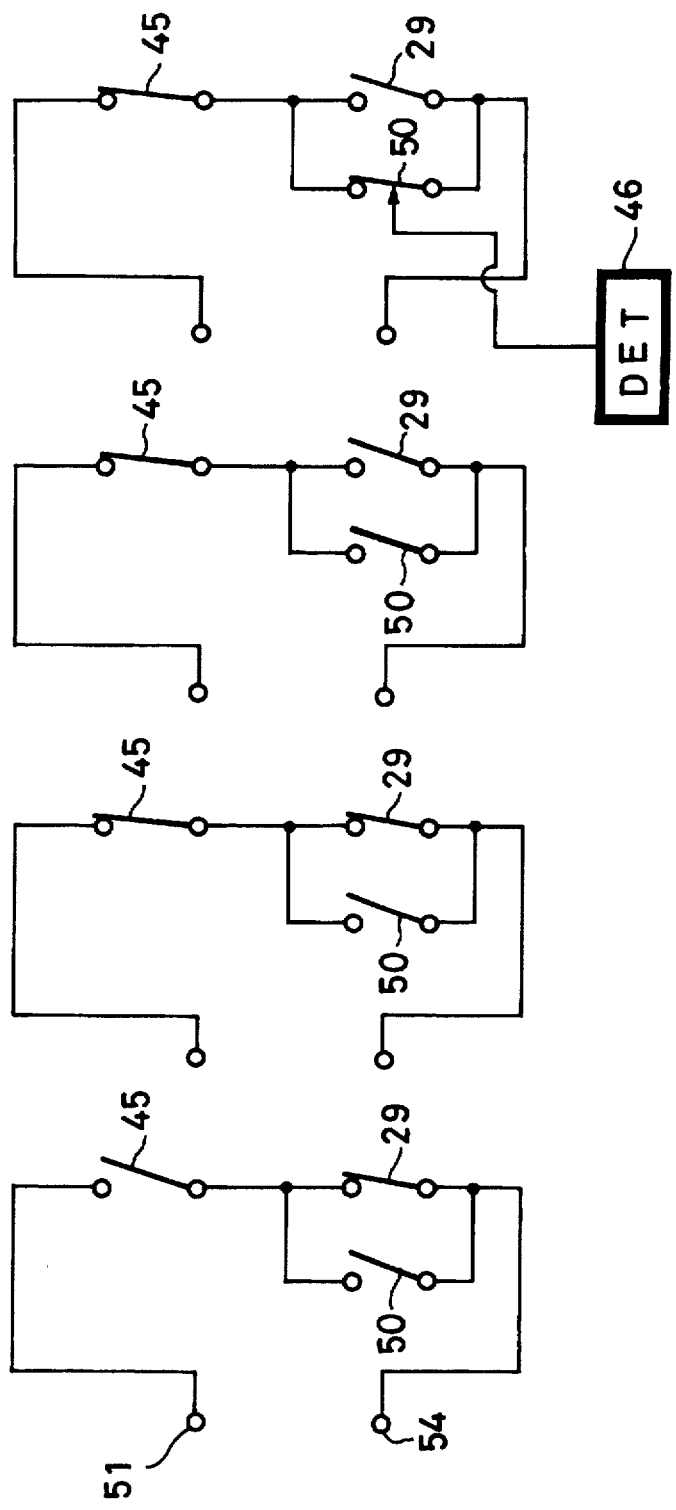

TELEPHONE HAVING A HOLD FUNCTION

This is a continuation of application Ser. No. 08/347,015 filed on Nov. 30, 1994 now abandoned, which is hereby incorporated by reference.

BACKGROUND

1. Field of the Invention

The present invention relates to a telephone and, more particularly, is directed to a telephone with a hold feature.

2. Background of the Invention

Key telephones with a hold feature have been commercially available on the market so far. In the key telephones, such hold feature is included as a basic features of service. An example of the key telephone will be described with reference to FIG. 1.

In FIG. 1 of the accompanying drawings, reference numeral 1 generally designates a key telephone. Reference numeral 2 designates a handset and reference numeral 3 designates a telephone body. The telephone body 3 has a plurality of dial keys 4 and a touch-sensitive dial key 6, etc., disposed on the surface of its panel.

The hold key 5 can hold a communication line when the user depresses (turns on) the hold key 5. During telephone conversation, the hold key 5 is of course turned off. The key telephone is given such a hold feature as described above so that, after the hold key 5 is operated, the users can make an intercommunication with a home telephone or a cordless telephone.

Specifically, according to the hold feature of the key telephone 1, after the hold key 5 is depressed, the hold state can be retained under the condition that the handset 2 is on a handset cradle 7 as shown in FIG. 1.

In the above-mentioned key telephone 1, in order to place the telephone 1 in the hold state after the main line of communication is picked up, the user depresses the hold key 5 and then places the handset 2 on the handset cradle 7. When the user wishes to resume a telephone call, the user can make a main line telephone communication by depressing the hold key 5 one more time. Therefore, it is cumbersome for the user to depress the hold key 5 several times in order to start the hold feature or to release the telephone 1 from the hold state.

As described above, the key telephone with the electrical hold key 5 is designed so that the handset 2 can be placed on the handset cradle 7 without disconnecting the telephone network line. However, it is frequently observed that the user feels uneasy about returning the handset 2 on the handset cradle 7 even after the hold key 5 is depressed and that most of the users are used to place the handset on the desk.

Further, even though the user places the handset 2 on the handset cradle 7 after the hold key 5 is depressed, it is not possible for the user to visually confirm that the telephone 1 is in the hold state. There is then the substantial possibility that the user will forget that the telephone 1 is placed in the hold state.

Furthermore, in the U.S.A., wall telephones are very popular because the wall telephone is very easy to be installed by using a modular connector provided on the wall of a kitchen or the like. However, the wall telephone is not provided with a mechanism, such as a handset cradle or the like for temporarily placing the handset 2 thereon so that, during telephone conversation, those who have to interrupt a telephone call or those who feel uneasy about the hold state of the telephone even after the hold key 5 is depressed often let the handset 2 hang down from the telephone body 3. In this state, it is unavoidable that a transmitter of the handset 2 picks up and transmits extraneous noise to the called phone. Furthermore, when the user wishes to resume, the telphone call by using another telephone connected in parallel to that line. There is then the problem that sound quality of a telephone call is deteriorated and noise is generated due to a lowered voltage of the telephone network line.

SUMMARY OF THE INVENTION

It is therefore an object of the present invention to provide a telephone in which the above-mentioned problems can be solved.

According to the present invention, there is provided a telephone which includes a telephone body, a handset and a telephone network line hold mechanism. The telephone network line hold mechanism is energized when the handset is placed on the telephone body at its position in which the offhook state of the telephone is retained.

According to the present invention, there is provided a telephone. The telephone is connected to the same telephone network line in parallel to another telephone. The first telephone includes a telephone body, a handset and a telephone network line hold mechanism. The telephone network line hold mechanism is energized when the handset is placed on the telephone body at its position in which the offhook state of the telephone is retained. The telephone network line hold mechanism is released from being operated when the other telephone is placed in the offhook state.

According to the present invention, it is possible to provide a telephone in which a hold feature can be realized without depressing a hold key. According to the telephone of the present invention, it is possible to effect the hold feature by placing the handset on the telephone body at its position other than the handset cradle.

BRIEF DESCRIPTION OF THE DRAWINGS

FIGS. 7A and 7B are diagrams showing arrangements of a telephone according to a fifth embodiment of the present invention, in which FIG. 7A is a plan view showing a telephone according to a fifth embodiment of the present invention, and FIG. 7B is a side view thereof;

FIGS. 10A through 10D are diagrams used to explain the operation of the telephone according to the present invention, respectively;

DESCRIPTION OF THE INVENTION

A wall key telephone with a hold feature included as a basic feature according to a first embodiment of the present invention will hereinafter be described in detail with reference to FIGS. 2 and 3. In FIGS. 2 and 3, like parts corresponding to those of FIG. 1 are marked with the same references and therefore need not be described in detail.

FIG. 2 is a perspective view showing an overall arrangement of the key telephone 1 according to the present invention under the condition that the telephone 1 is placed in the hold state. FIG. 3 is a cross-sectional side view showing the telephone 1 wherein the handset 2 and the telephone body 3 are partly illustrated in a cross-sectional fashion.

The key telephone 1 according to the first embodiment of the present invention is a wall key telephone having a telephone body 3, the rear surface of which is attached to a wall surface 8. The telephone 1 is attached to the wall surface 8 such that the panel surface of the telephone body 3, is inclined from the wall surface 8, on which the dial keys are disposed. Specifically, as shown in FIG. 3, the telephone 1 is attached to the wall surface 8 such that an upper surface plate 3U of the telephone body 3 becomes perpendicular to the wall surface and that the panel surface from the tip end of the upper surface plate 3U is inclined toward the wall surface 8 in the lower direction.

Figure 1:
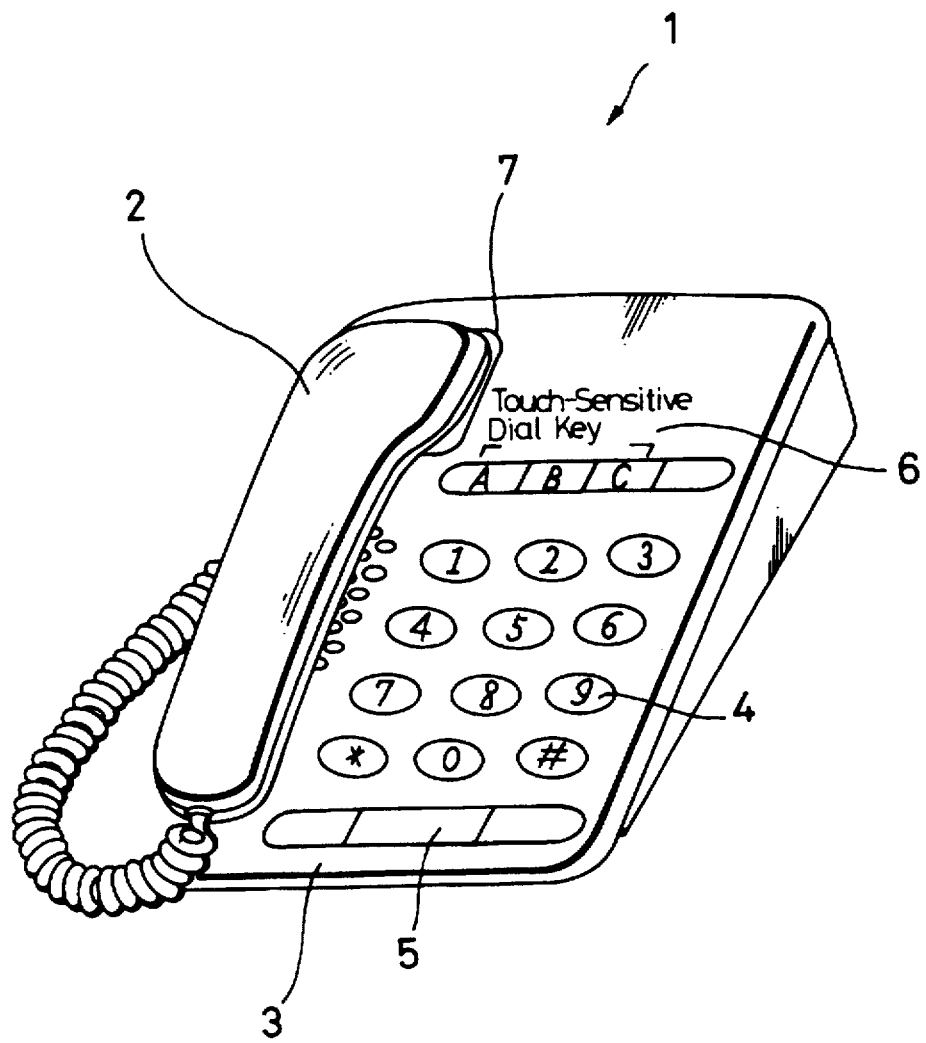
FIG. 1 is a perspective view showing an example of a telephone which is now commercially available on the market.
Figure 2:
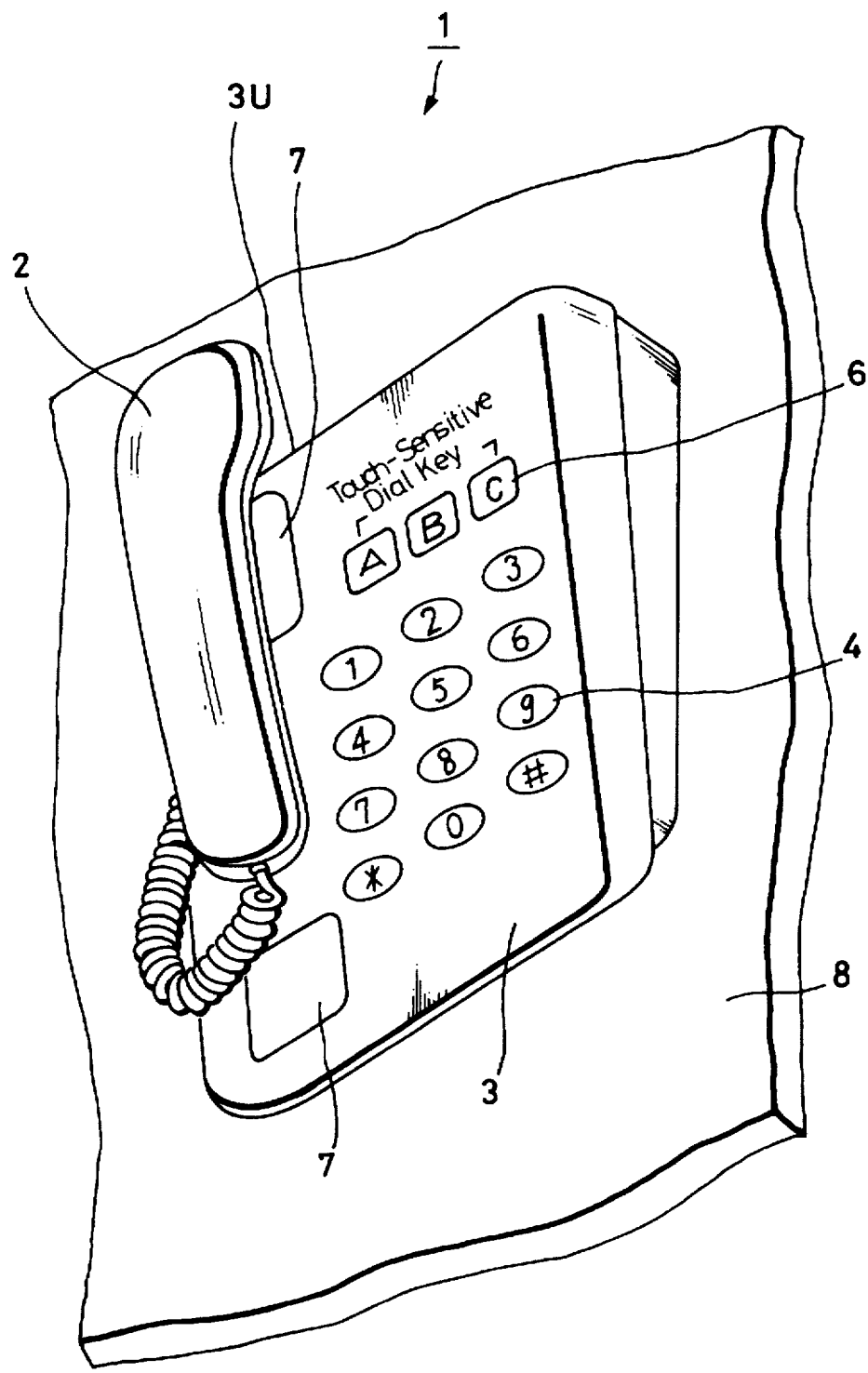
FIG. 2 is a perspective view showing a telephone according to a first embodiment of the present invention.
Figure 3:
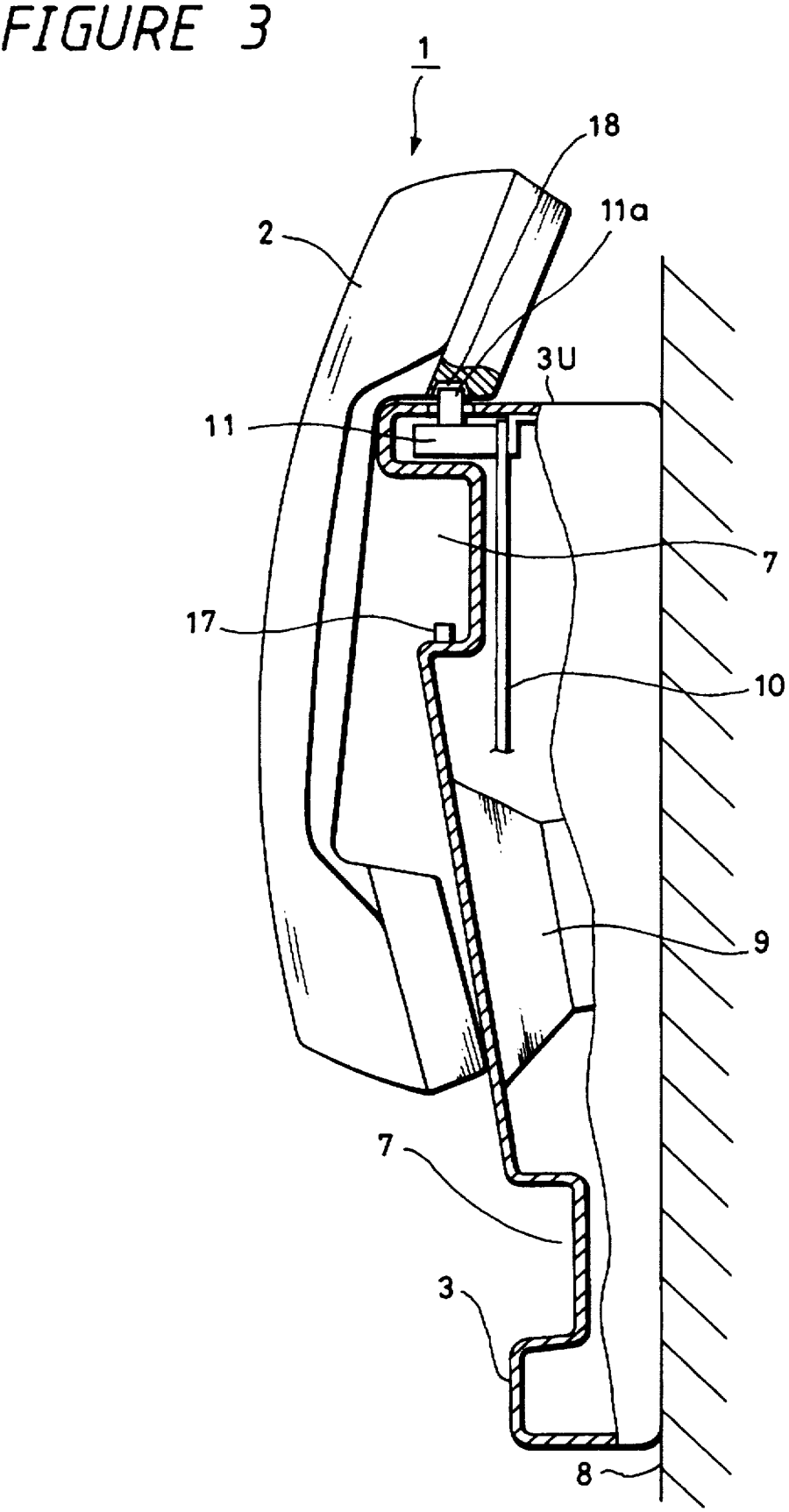
FIG. 3 is a cross-sectional side view showing the telephone according to the first embodiment of the present invention.

As shown in FIG. 2, the wall key telephone 1 includes the touch-sensitive dial key 6 and the handset cradle 7 similar to the telephone 1 shown in FIG. 1 and is different from the telephone 1 shown in FIG. 1 only in that the wall key telephone 1 shown in FIGS. 2 and 3 has no hold key 5 disposed on the panel surface.

As shown in FIG. 2, upon telephone conversation, the hold function is started when the user who may answer an incoming call places the receiver portion of the handset 2 on the upper surface plate 3U of the wall key telephone 1.

An example of a detection mechanism for actuating the hold function will be described with reference to a cross-sectional side view of FIG. 3.

The handset 2 has an ear piece in which a receiver is incorporated and a receiver head formed on the lower end of the ear piece casing has an engagement concave portion 18 which comes into engagement with a hook portion 17. When the handset 2 is hooked on the lower portion of the handset cradle 7, the hook portion 17 is engaged with the engagement concave portion 18, thereby preventing the handset 2 from being dropped from the handset cradle 7. The engagement concave portion 18 is formed on the inner wall portion of the receiver portion.

As is clear from the cross-sectional side view of FIG. 3 showing the handset cradle portion, the key telephone 1 includes in its telephone body 3 a speaker 9 disposed on the lower surface of sound emanating apertures and a printed circuit board 10. The printed circuit board 10 includes a hook switch 11 disposed therein. An operation member 11a of the hook switch 11 is slightly projected from the upper surface plate 3U of the telephone body 3. A diameter of the operation member 11a is made substantially the same as that of the hook portion 17. When the hold operation of the telephone 1 is carried out, the user lifts the handset 2 from the handset cradle 7. Then, as shown in FIG. 3, when the user places the handset 2 on the upper surface plate 3U of the telephone body 3, the operation member 11a is engaged with the engagement concave portion 18. Thus, it is possible to prevent the handset 2 from being dropped from the telephone body 3 when the telephone 1 is placed in the hold state. The depth of the engagement concave portion 18 is made smaller than the projected amount of the operation member 11a of the upper surface plate 3U of the telephone body 3 so that, when the user places the handset 2 on the upper surface plate 3U of the telephone body 3, the operation member 11a of the hook switch 11 can reliably be operated by the bottom surface of the engagement concave portion 18.

According to the first embodiment of the present invention, when the user places the receiver portion of the handset 2 on the upper surface plate 3U of the telephone body 3, the operation member 11a of the hook switch 11 is pushed by the bottom surface of the engagement concave portion 18 formed at the receiver portion with the result that the hook switch 11 is switched to the "connection" state, thus placing the telephone in the hold state. Specifically, unlike the key telephone 1 shown in FIG. 1, according to the first embodiment, the hold key 5 need not be operated and the hold state can be set readily. When a telephone call is made, it is sufficient for the user to lift the handset 2 from the upper surface plate 3U. Further, it is possible that hold tone sounds or melody tone sounds may be emanated from the speaker 9 based on the "connection" state of the hook switch 11.

According to the telephone thus arranged, it becomes possible to place the telephone 1 in the hold state only by placing the handset 2 on a proper position different from the ordinary handset cradle position on the telephone body 3 of the telephone 1; for example, in the position in which the offhook state is not set. Also, it becomes possible to release the telephone 1 from the hold state only by detaching the placed or engaged handset 2 from the telephone body 3. Furthermore, unlike the telephone 1 shown in FIG. 1, the keys, such as the hold key 5 or the like need not be disposed on the panel surface in parallel to the dial keys 4. Thus, the hold operation can be set by a simple operation. Also, it is possible for the user to visually confirm the hold state from the disposed position of the handset 2. Therefore, the hold display function can be easily achieved.

Figure 4:
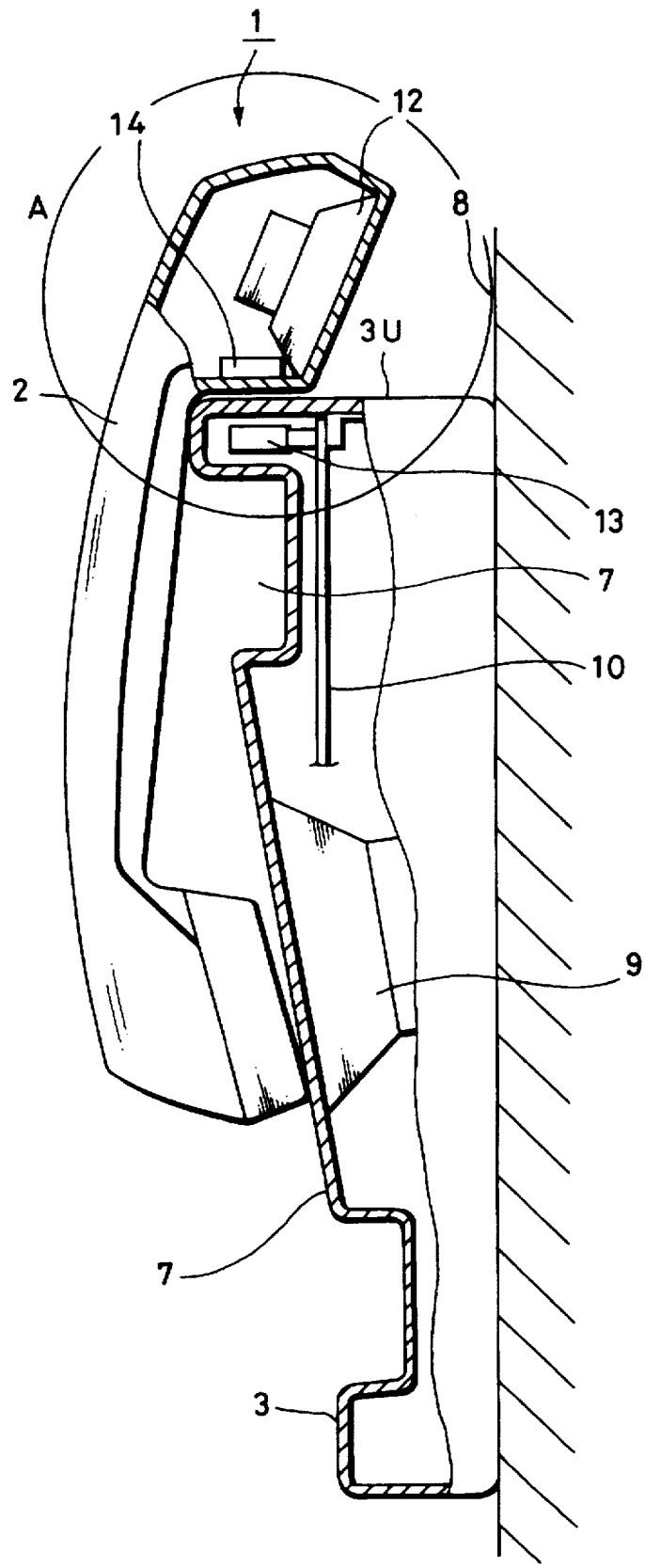
FIG. 4 is a cross-sectional side view showing a telephone according to a second embodiment of the present invention.

FIG. 4 shows a telephone according to a second embodiment of the present invention. In FIG. 4, elements and parts identical to those of the first embodiment are marked with the same references and therefore need not be described in detail.

According to the second embodiment of the present invention, the printed circuit board 10 includes a magnetic sensor 13, such as a Hall element and a lead switch or the like, disposed on the inside of the upper surface plate 3U. On the other hand, a magnet 14 is disposed on the receiver portion of the handset 2 at its position in which the receiver portion of the handset 2 opposes the magnetic sensor 13 when the user places the receiver portion on the upper surface plate 3U. Though not shown, also in accordance with the second embodiment, an engagement concave portion is formed on the receiver portion of the handset 2 and an engagement projection that comes in engagement with the engagement concave portion of the handset 2 is formed on the upper surface plate 3U of the telephone body 3. An engagement projection similar to the engagement projection formed on the upper surface plate 3U is also formed on the handset cradle 7.

Also according to the second embodiment of the present invention, similarly to the first embodiment, when the handset 2 is hooked on the telephone body 3, the magnetic sensor 13 detects that the magnet 14 is brought close to the magnetic sensor 13 and energizes the hold function. When the handset 2 is removed from the telephone body 3, the magnetic sensor 13 releases the hold function.

Figure 5:
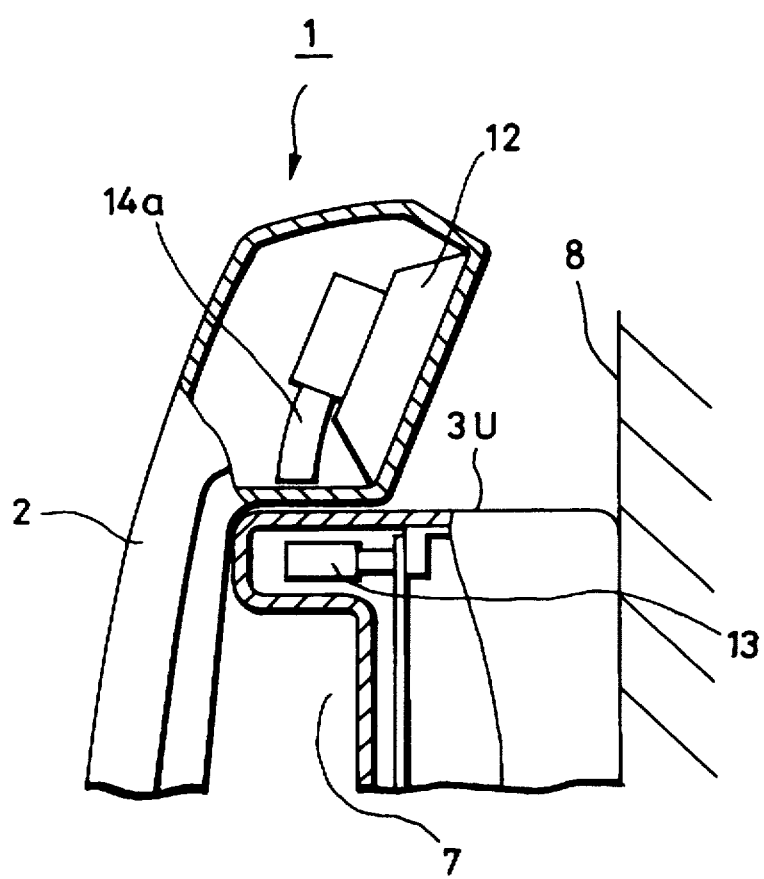
FIG. 5 is a fragmentary cross-sectional view of a portion corresponding to a portion A of FIG. 4 and illustrating a telephone according to a third embodiment of the present invention.

FIG. 5 shows an arrangement of a telephone according to a third embodiment of the present invention. FIG. 5 shows an arrangement of a portion corresponding to a portion A of FIG. 4. In FIG. 5, like parts corresponding to those of the first embodiment are marked with the same references.

In the second embodiment shown in FIG. 4, the magnet 14 that is detected by the magnetic sensor 13 is disposed within the receiver portion of the handset 2. According to the third embodiment, as shown in FIG. 5, a magnetic plate 14a made of an iron plate is cut in square. One end of the magnetic plate 14a is brought in contact with a magnet or a magnetic circuit of the receiver 12 and the other end thereof is elongated toward the lower end of the receiver portion. When the handset 2 is hooked on the upper surface plate 3U of the telephone body 3, the other end of the magnetic plate 14a is opposed to the magnetic sensor 13. At that time, the magnetic plate 14a is magnetized by the magnet of the receiver 12 so that a magnetic field generated from the magnetic plate 14a can be detected by the magnetic sensor 13. As a consequence, similarly to the second embodiment, the operation of the hold function can be started and/or released.

In the telephones shown in FIGS. 4 and 5, the switch is not turned on by mechanical operation executed when the handset 2 is hooked on the telephone body 3 and therefore a special switch operation mechanism need not be provided on the upper surface plate 3U of the telephone body 3. Consequently, the detection mechanism of the telephone can be simplified in arrangement.

Figure 6:
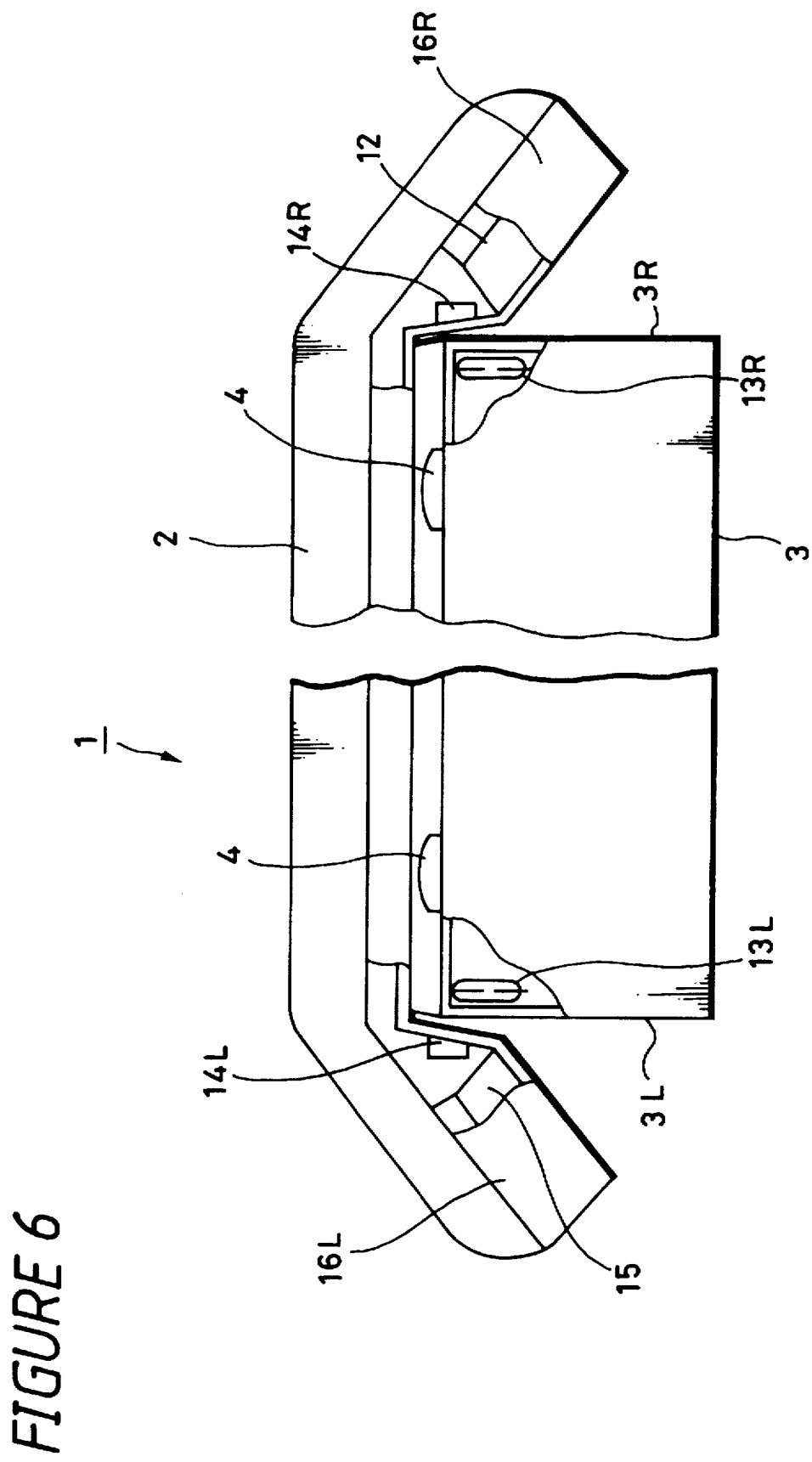
FIG. 6 is a diagram used to explain a telephone according to a fourth embodiment of the present invention.

FIG. 6 shows an arrangement of a telephone according to a fourth embodiment of the present invention. In FIG. 6, like parts corresponding to those of the first embodiment are marked with the same references. According to the fourth embodiment, as shown in FIG. 6, when the telephone is set in the hold state, it is possible to start and/or release the operation of the hold function by placing the handset 2 on the telephone body 3 across the dial keys 4 of the key telephone 1.

Specifically, the telephone body 3 includes lead switches 13L, 13R disposed on upper ends of its left and right side walls 3L, 3R as magnetic sensors. Also, the handset 2 includes magnets 14L, 14R disposed in its transmitter portions 16L, 16R.

When the handset 2 is placed on the telephone body 3 across a plurality of dial keys 4 disposed on the telephone body 3, the lead switches 13L, 13R and the magnets 14L, 14R of the handset 2 are opposed to one another with the result that the operation of the hold function is started on the basis of the output signals from the lead switches 13L, 13R. In this case, if the operation of the hold function is started based on an AND signal of the output signals from the lead switches 13L, 13R, then it becomes possible to start the operation of the hold function more reliably.

The magnets 14L, 14R are respectively disposed at the positions such that the transmitter portion 16L and the receiver portion 16R of the handset 2 are opposed to the lead switches 13L, 13R when the handset 2 is placed on the telephone body 3 across the dial keys 4. The structure of the telephone body 3 determines where the handset 2 can be horizontally placed when the telephone is to be placed in the hold state. Also in this case, the magnets of the transmitter 15 and receiver 12 can serve also as the magnets 14L, 14R as shown in the arrangement shown in FIG. 5. It is clear that the positions at which the magnets 14L, 14R and the lead switches 13L, 13R may be reversed to those shown in FIG. 6, i.e., the lead switches 13L, 13R are disposed on the handset 2 side and the magnets 14L, 14R are disposed on the telephone body 3 side.

In the fourth embodiment of the present invention, the telephone body 3 has the lead switches 13L, 13R disposed near the upper portions of the left and right side walls 3L, 3R and the hold operation is carried out by the AND output of the output signals from the two lead switches 13L, 13R. The present invention is not limited thereto and it is possible to carry out the hold operation only by the output from one lead switch. Alternatively, it is of course possible that the combination of the magnet and sensor may be replaced with the mechanical switch as shown in FIG. 2.

While the handset 2 and the upper surfaces of a plurality of keys 4, are detached when the handset 2 is placed on the telephone body 3 of the key telephone 1 across the dial keys 4 as shown in FIG. 6, the present invention is not limited thereto and it is possible to carry out the hold operation by an AND signal of detected signals from the three dial keys 4 when the handset 2 is placed on the telephone body 3 so that the handset 2 simultaneously depresses a plurality of dial keys 4, as shown in FIG. 2, for example. In this case, the lead switches 13L, 13R and the magnets 14L, 14R can be omitted.

According to the arrangement shown in FIG. 6, since it is sufficient that only the hold position of the handset 2 is specified on the telephone body 3, the telephone body 3 and the handset 2 need not be worked mechanically.

While the ordinary one handset cradle 7 is disposed on the telephone body 3 of the key telephone 1 as described above, the present invention is not limited thereto and a telephone according to a fifth embodiment of the present invention in which the telephone body 3 includes a separate hold handset cradle will be described with reference to FIG. 7A, 7B and the following description.

Figure 7A:
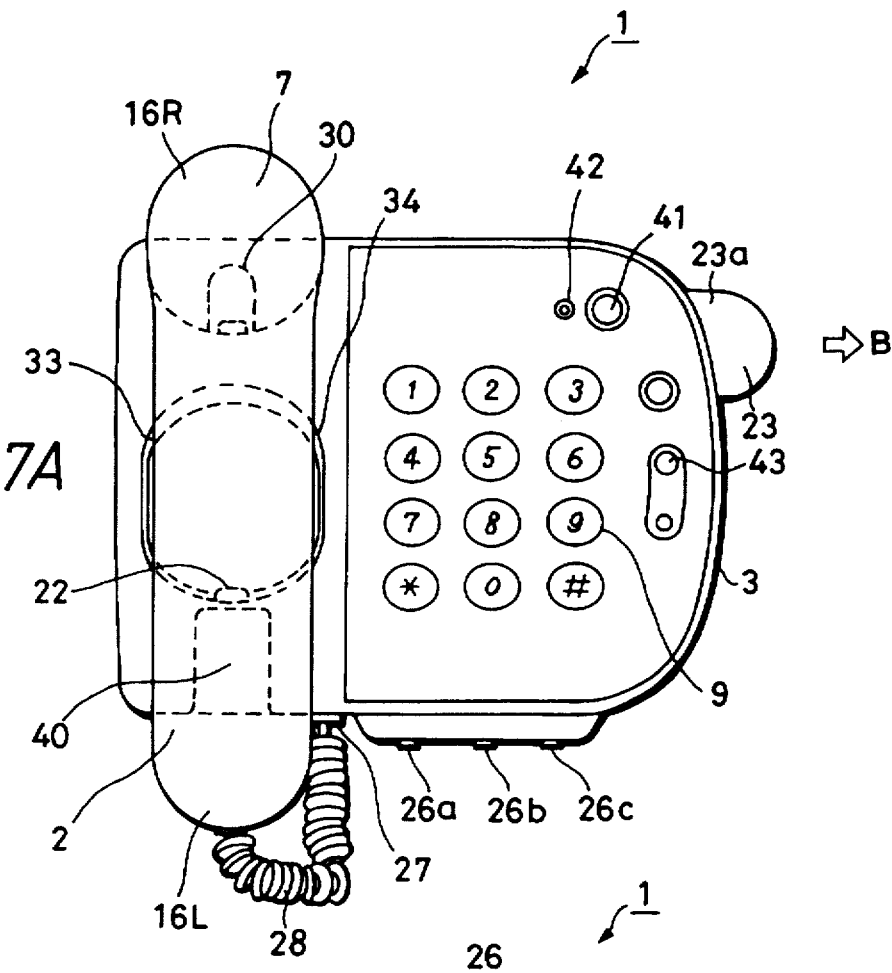
Figure 7B:
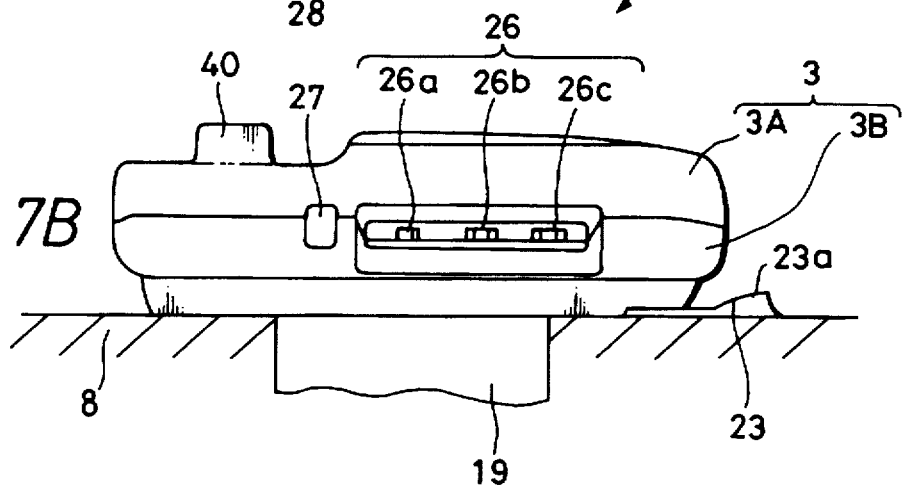
Figure 8:
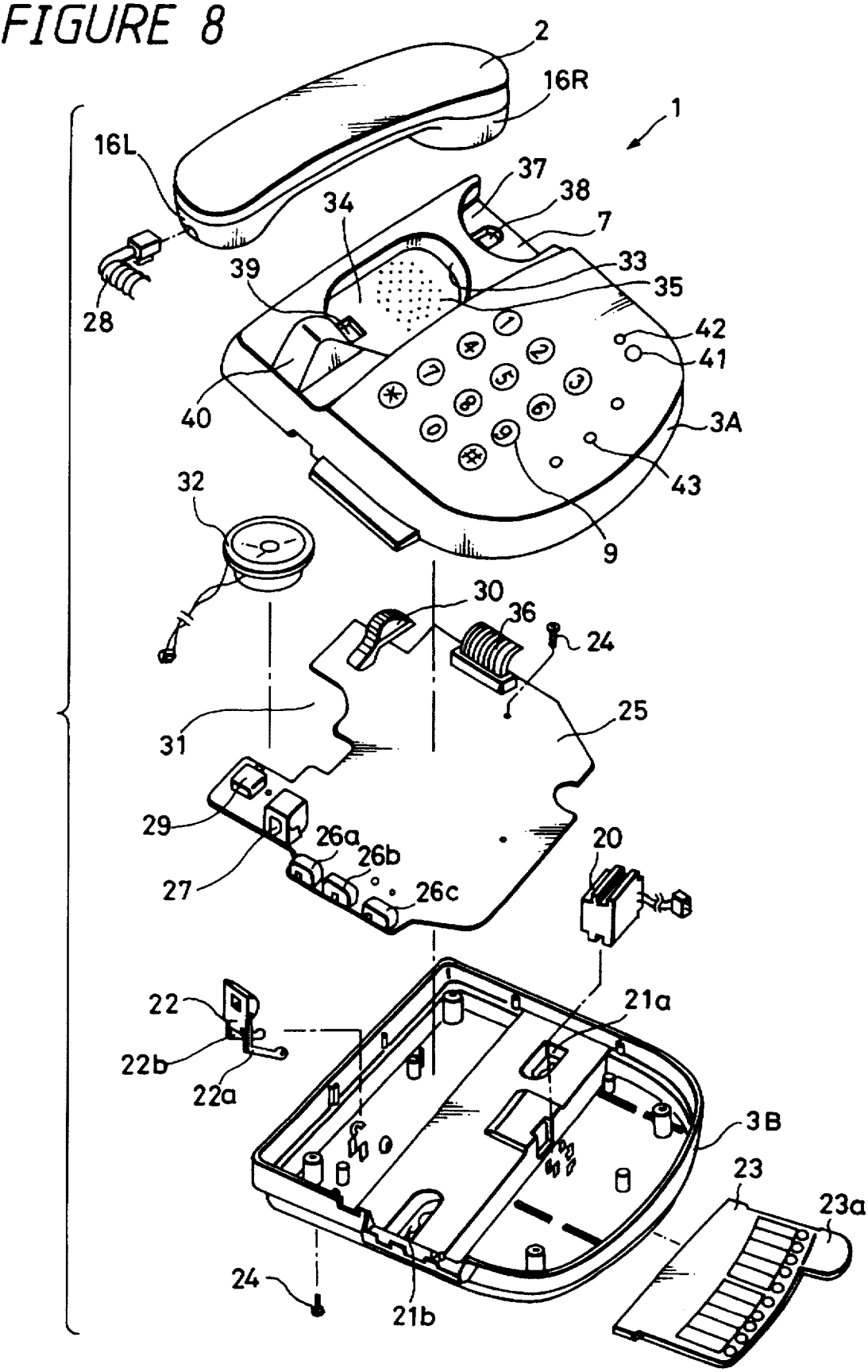
FIG. 8 is an exploded perspective view of the telephone according to the fifth embodiment of the present invention.

FIGS. 7A, 7B are respectively a plan view and a front view showing the wall key telephone 1 in which the telephone body 3 includes a hold handset cradle. FIG. 8 shows an exploded view of the assembly state of the key telephone shown in FIGS. 7A, 7B. An arrangement of the telephone 1 according to a sixth embodiment of the present invention will be described with reference to FIGS. 7A, 7B and FIG. 8 throughout which like parts corresponding to those of FIGS. 2 to 6 are marked with the same references and therefore need not be described in detail.

The telephone body 3 of the key telephone 1 is substantially oblong rectangular solid in shape. In the United States households, the wall surface 8 preferably includes a modular connection socket 19 which serves as a telephone connection socket. The Electrical connection can be made by inserting a connection plug provided on the bottom surface of the telephone body 3 into a telephone network line connection plug fitted into the modular connection socket 19. Also, the user can suspend the wall telephone on the wall surface 8 with ease such that the wall telephone can perfectly hide the modular connection socket 19 disposed on the wall surface 8.

As shown in FIG. 8, the telephone body 3 is composed of an upper half 3A and a lower half 3B of substantially boxshape and preferably made of synthetic resin, said halves being integrally fastened. When a modular connection plug 20 disposed at substantially the central position of the lower half 3B is inserted into the connection seat formed in the modular connection socket 19 of the wall surface 8, the modular connection plug 20 and the connection seat of the modular connection socket 19 are electrically connected to thereby transmit and receive a signal. The telephone body 3 is suspended on the wall surface 8 by fitting hook protrusions provided in the modulator connection socket 19 into engagement through-holes 21a, 21b. Reference numeral 23 depicts a memo card paper on which the user can write names corresponding to abbreviated dialing nos. etc. When not in use, the memo card paper 23 is accommodated between the bottom plate and the wall surface of the lower half 3B. When the memo card paper 23 is in use, the user pulls the memo card paper 23 in the direction shown by an arrow B in FIG. 7A with a tab 23a so that the user can see contents of memos with ease under the condition that the telephone body 3 is attached to the wall surface 8. The lower half 3B includes an operation button for operating a hold switch as will be described later on.

A printed circuit board 25 is attached to the inside of the lower half 3B by a screw 24. The printed circuit board 25 has a plurality of slide switches 26a, 26b, 26c projected from the side wall of the lower half 3B. Of the slide switches 26a, 26b and 26c, the slide switch 26a is a dial mode switching slide switch to switch a pulse signal and a tone signal. The slide switch 26b is a switching slide switch to switch a bell sound in the three levels of "high", "low" and "off". The slide switch 26c is a speaker volume switching slide switch to switch "high tone", "middle tone" and "low tone" of sounds emanated from a speaker. Reference numeral 27 depicts a handset connection plug seat which is connected to a handset cord 28, reference numeral 29 depicts a hold switch and reference numeral 30 depicts a hook button. A ringer speaker 32 is disposed in a recess 31 of the printed circuit board 25. This speaker 32 is placed on the lower side of a hold handset cradle 33 of the upper half 3A. Reference numeral 36 depicts a 13P connector connected to a key base plate (not shown) provided on the lower end of the upper half 3A. The 13P connector 36 is connected to the dial keys 4 or the like.

The upper half 3A includes the ordinary handset cradle 7 of the handset 2 formed on its upper left portion as a semi-circular concave portion 37. The semi-circular concave portion 37 has a through-hole 38 defined on the lower end thereof so as to project a part of the hook button 30 mounted on the printed circuit board 25.

Figure 9:
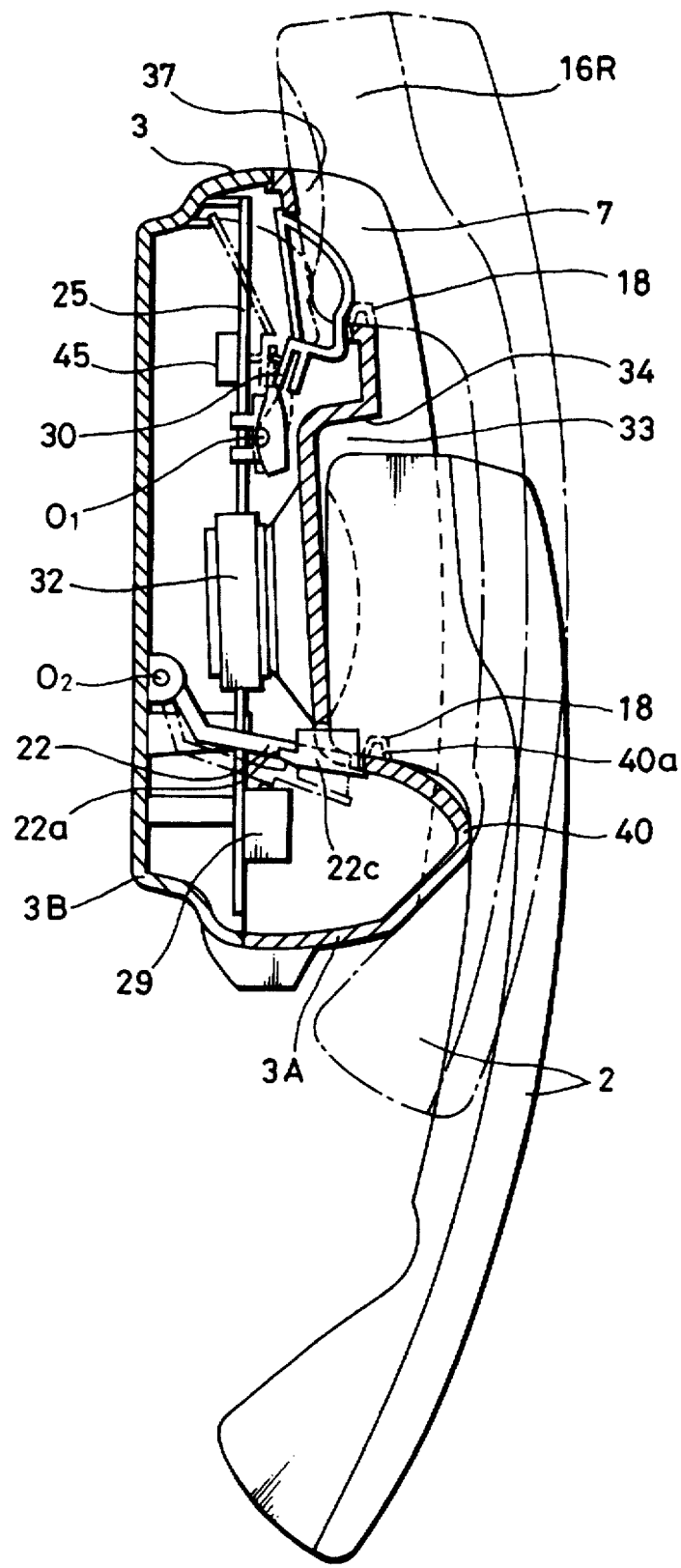
FIG. 9 is a elevational cross-sectional view used to explain operation of a hold button and a hook button of the telephone according to the present invention.

The ordinary handset cradle 7 preferably has on its lower side (lower side in FIG. 7A) an elliptical concave portion 34 into which the receiver portion 16R of the handset 2 can be inserted. The concave portion 34 has a plurality of very small sound generating apertures 35 for the speaker 32 defined on the bottom portion thereof. Also, the concave portion 34 has a through-hole 39 defined on the bottom portion thereof so as to project from the bottom surface portion of the concave portion 34 a part of the operation button 22 attached to the lower half 3B. Thus, the hold handset cradle 33 is constructed. The operation button 22 includes a pair of arms 22a, 22b and is attached to the lower half 3B such that these arms 22a, 22b can be rotated about a rotational center $O_2$, as seen in FIG. 9.

The hold handset cradle 33 has a projected portion 40 formed on its lower side (lower side in FIG. 7A). The projected portion 40 functions as a hook portion and is used when the receiver portion 16R of the handset 2 is suspended on the concave portion 34 of the hold handset cradle 33.

The upper half 3A preferably includes an on-hook dial key 41, an on-hook LED (light emitting diode) 42 and a speed dial key 43 or the like disposed on its right-hand side panel portion in addition to the dial keys 4.

Operation of the hook button 30 and the operation button 22 which operates the hold switch 29 provided under the condition that the wall key telephone 1 is set in the normal non-communication state and in the hold state will be described with reference to FIG. 9. FIG. 9 is a schematic cross-sectional side view showing the condition that the handset 2 is placed on the hold handset cradle 33 of the key telephone 1 and that the handset 2 is placed on the normal handset cradle 7. As shown by a one-dot phantom line in FIG. 9, under the condition that the receiver portion 16R is hooked on the semi-circular concave portion 37 of the normal handset cradle 7, the receiver portion 16R presses the projected surface of the through-hole 38 of the hook button 30 pivotally mounted on the base plate 25. The hook button 30 is rotated about a rotational center $O_1$ in the counter-clockwise direction as shown by a one-dot chain phantom line in FIG. 9 with the result that the hook switch 45 is switched to "disconnection" (on-hook) state by the hook button 30. Then, if the handset 2 is lifted from the handset cradle 7, then the hook button 30 is rotated about the rotational center $O_1$ in the clockwise direction with the result that the hook switch 45 is switched to "connection" (offhook) state. In actual practice, the hook projection portion formed on the upper half 3A is engaged with the engagement concave portion 18 provided on the lower end of the receiver portion 16R of the handset 2, thereby preventing the handset 2 from slipping down from the handset cradle 7.

In order to set the telephone 1 in the hold state, the receiver portion 16R of the handset 2 that was lifted up from the handset cradle 7 is inserted into the concave portion 34 of the hold handset cradle 33. Also, the hook protrusion 40a formed on the upper surface of the projection portion 40 is engaged with the engagement concave portion 18 formed on the lower surface (lower surface used when the telephone 1 is attached to the wall surface 8) of the receiver portion 16R. The operation portion 22c of the operation button 22 that is attached to the lower half 3B of the telephone body 3 so as to become rotatable about the rotational center $O_2$ is partly projected from the through-hole 39 defined in the concave portion 34 so that the operation portion 22c is pressed by the lower surface of the receiver portion 16R in the lower direction shown in FIG. 9. As a result, the arms 22a, 22b of the operation button 22 are rotated about the rotational center $O_2$ in the clockwise direction as shown by a one-dot chain phantom line, thereby depressing hold switch 29 disposed on the lower ends of the arms 22a, 22b. Then, the hold switch 29 is switched and set in the on-hook state, i.e., switched to the "disconnection" state. Thus, the telephone 1 is set in the hold state as will be described later on. If the receiver portion 16R of the handset 2 is detached from the hold handset cradle 33, the hold state of the telephone 1 is released.

A theoretical circuit arrangement of the hook switch 45 and the hold switch 29 will be described below with reference to FIGS. 10A through 10D. Actual circuits of the hook switch 45 and the hold switch 29 are provided in the path in which a received voltage, rectified by a power supply circuit, is supplied from transmission and reception terminals of the main wire through a noise filter to a dialer circuit as will be described later on. These switches 29 and 45 are each preferably formed of a 2-contact switch.

As shown in FIGS. 10A to 10D, the switches 45 and 29 that are connected in series are connected in parallel between the dialer circuit and the power supply circuits to which the voltage which results from rectifying the signal supplied to the main wire input terminal is supplied. The hold switches 29 have electrically-controllable network line switches 50 connected thereto in parallel. In actual practice, the network line switches 50 are inserted into circuit systems which connect and disconnect the network line as will be described later on. Each of the hook switches 45 and the hold switches 29 is preferably formed of the 2-contact switch as will be described later on.

FIG. 10A shows the on-hook state wherein the handset 2 is placed on the handset cradle 7 (i.e., not on the hold handset cradle 33. As shown in FIG. 10A, in this state, the hook switch 45 is set in the on-hook state and in the "disconnection" state. The hold switch 29 is set in the offhook state and in the "connection" state. The network line switch 50 is set in the "disconnection" state.

In the telephone conversation state in which a telephone call is made from the on-hook state shown in FIG. 10A, as shown in FIG. 10B, the handset 2 that was placed on the handset cradle 7 is lifted up from the telephone body 3 and placed in the offhook state so that the switch 45 is switched to the "connection" state. At that time, the hold switch 29 is set in the offhook state and in the "connection" state. Thus, the hold function cannot be effected and the user can make a telephone call.

Then, if the user places the handset 2 on the hold handset cradle 33 after the handset 2 was lifted up from the handset cradle 7 in order to effect operations, such as main wire communication, hold and transmission call or the like, as shown in FIG. 10C, the hook switch 45 is switched to the offhook state, i.e., the "connection" state and the hold switch 29 is switched to the on-hook state, i.e., the "disconnection" state. As shown in FIG. 10D, a detector (DET) 46 detects that the handset 2 is placed on the hold handset cradle 33 and the network switch 50 is switched to the "connection" state by a hook detected signal. The hook detected signal is supplied to the dialer circuit which will be described later on, in actual practice, and the dialer circuit controls the network line switch 50. Therefore, in FIG. 10D, the hold state of the network line is retained even when the hook switch 45 of the handset cradle 7 is set in the offhook state and the hold switch 29 of the hold handset cradle 33 is set in the on-hook state. The network switch 50 is of course switched to the "disconnection" state when the handset 2 is lifted from the handset 2.

An arrangement in which one wall telephone is set in the hold state as shown in FIG. 10D and a telephone communication is transferred to or switched to another telephone 1A connected to the network line of the wall telephone 1 (preferably through the modular connection socket provided in the house in parallel) will be described with reference to FIGS. 11A and 11B.

Figure 11A:
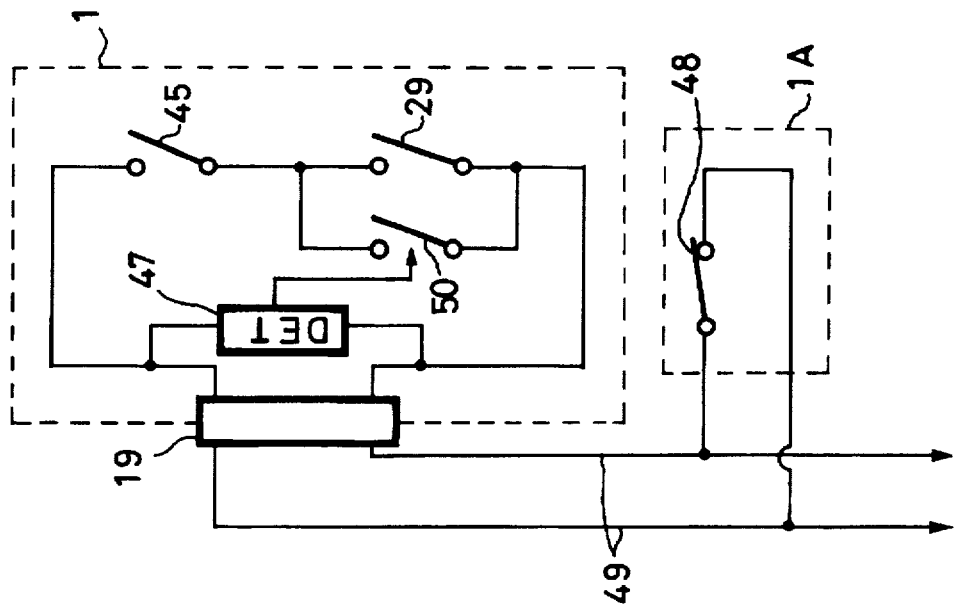
FIGS. 11A and 11B are diagrams used to explain other arrangements of a telephone according to the present invention.

If the handset 2 is placed on the hold handset cradle 33 of the first wall telephone 1 and the second telephone 1A parallelly connected to the inside telephone network line 49 is set in the on-hook state and a hook switch 48 is set in the "disconnection" state as shown in FIG. 11A, there is then no trouble. However, as shown in FIG. 11B, if the second telephone 1A is set in the offhook state, then not only the handset 2 picks up a noise generated around the first telephone 1 but also the voltage of the inside telephone network line 49 drop; and correspondingly, the volume drop. According to one embodiment of the present invention as shown in FIGS. 11A and 11B, a lowered voltage developed across the inside telephone network line 49 is detected by a voltage detecting circuit (DET) 47. The voltage detecting circuit 47 detects that the lowered voltage of the first telephone 1 becomes lower than a predetermined threshold value. Then, the network line switch 50 is switched to the "disconnection" state and the hold state is released automatically. A detected signal from the voltage detecting circuit 47 is supplied to an automatic hold and release detecting circuit (not shown) and the network line switch 50 is controlled by the automatic hold and release detecting circuit. As a result, if the second telephone 1A is set in the offhook state, then the hold state of the first telephone 1 can automatically be released. Therefore, it is possible to provide a telephone in which deterioration of the sound quality of telephone call can be prevented and a noise can be prevented from entering into the sound due to the lowered voltage of the inside telephone network line.

A practical circuit arrangement of the hook switch 45 and the hold switch 29 within the telephone will be described with reference to FIG. 12.

Figure 12:
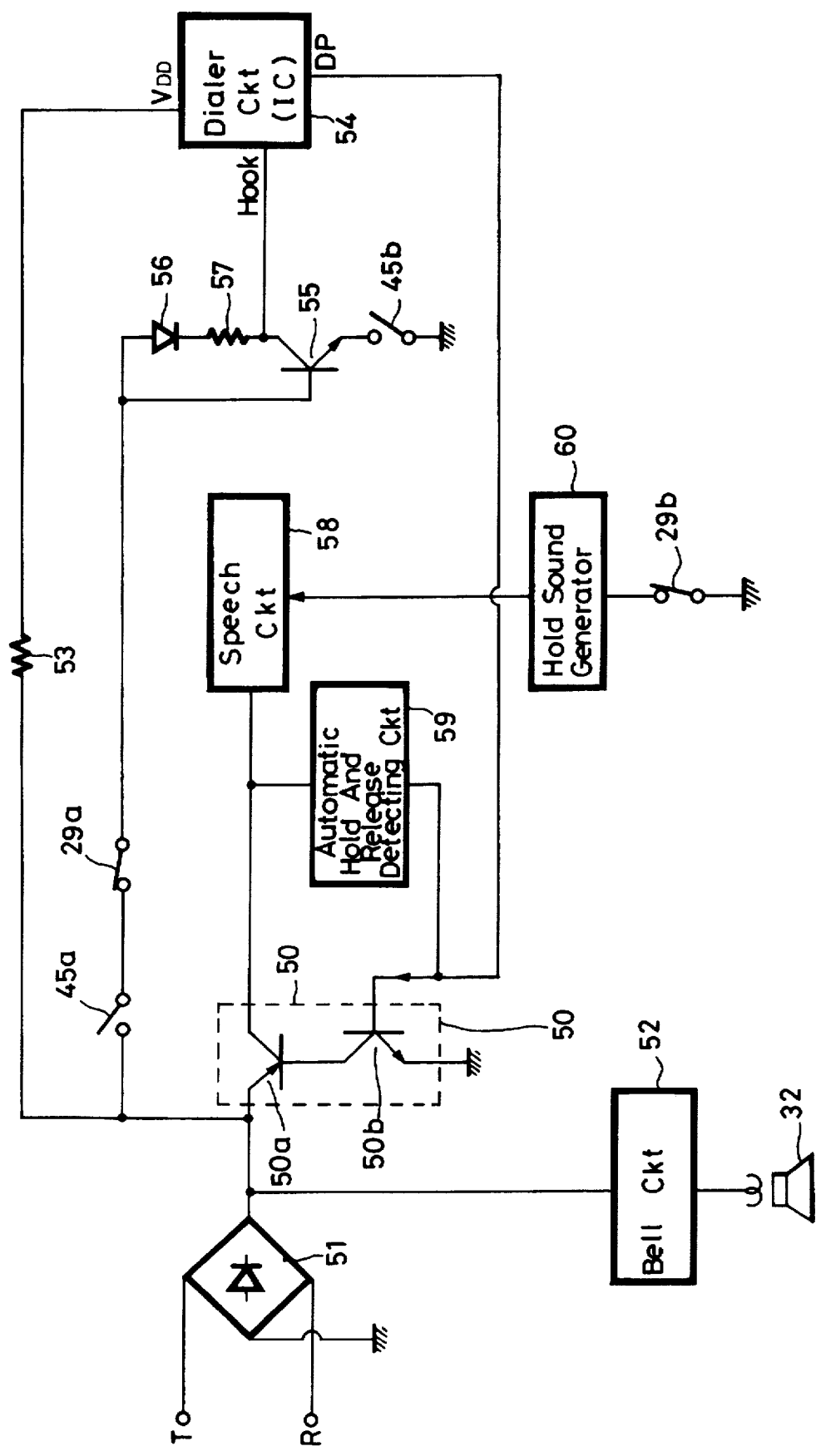
FIG. 12 is a block diagram showing a practical circuit arrangement of the telephone according to the present invention.

In FIG. 12, reference symbol T depicts a signal transmission terminal, reference symbol R depicts a reception terminal and reference numeral 51 depicts a power supply circuit of a diode-bridge configuration. An output from the power supply circuit 51 is supplied through a bell circuit 52 to the speaker 32 from which a tone ringer sound emanates. Also, the output from the power supply circuit 51 is supplied through a resistor 53 to a dialer circuit (IC) 54 as a voltage $V_{DD}$. A series circuit of the hook switch 45 and the hold switch 29 is connected in parallel to the dialer circuit 54 to which the voltage VDD is supplied. The hook switch 45 and the hold switch 29 are preferably formed of switches composed of double-pole double throw switches 45a, 45b and 29a, 29b.

One end of the first contact 45a of the hook switch 45 is connected to the output terminal of the power supply circuit 51, and the other end thereof is connected in series to the first contact 29a of the hold switch 29. The other end of the first contact 29a of the hold switch 29 is connected to the base of a switching transistor 55 and the anode of a diode 56. The emitter of the transistor 55 is connected to a second contact 45b of the hook switch 45, and the other end of the second contact 45b of the hook switch 45 is connected to the ground. The cathode of the diode 56 is connected through a resistor 57 to the collector of the transistor 55, and a hook signal is output from the collector of the transistor 55 to the dialer circuit 54.

The power supply circuit 51 is further connected to the emitter of a first transistor 50a which comprises part of the network line switch 50 which in turn serve as a connection/disconnection switch of the aforementioned circuit. The collector of the first transistor 50a is connected to a speech circuit 58 and an automatic hold and release detecting circuit 59. The speech circuit 58 transmits and receives a speech signal. When the second contact 29b of the hold switch 29 whose one end is connected to the ground is switched to the "disconnection" state, the speech circuit 58 outputs a hold sound generated from a hold sound generator 60 to the receiver or the network line. A detected output from the automatic hold and release detecting circuit 59 is supplied to the base of a second transistor 50b of the network line switch 50. The collector of the second transistor 50b is connected to the base of the first transistor 50a, and the emitter of the second transistor 50b is connected to the ground. Further, a dial pulse signal DP from the dialer circuit 54 is supplied to the base of the second transistor 50b.

FIG. 12 shows the on-hook state in which the handset 2 is placed on the handset cradle 7. When a telephone call is made, the first and second contacts 45a, 45b of the hook switch 45 are switched to the "connection" state and set in the "offhook" state. Moreover, the first and second contacts 29a, 29b of the hold switch 29 are set in the "offhook" state and in the "connection" state. As a consequence, the base of the transistor 55 is biased and the collector-emitter path thereof is made conductive so that the hook signal is supplied to the dialer circuit 54.

When the hook signal is supplied to the dialer circuit 54, the dialer circuit 54 supplies the dial pulse signal DP to the base of the second transistor 50b of the network line switch 50. Thus, the second transistor 50b is turned on, the first transistor 50a is biased and the first transistor 50a is turned on. As a result, the speech circuit 58 is supplied with the dial pulse signal DP. Therefore, the dial pulse signal DP is output through the speech circuit 58 and the speech signal is transmitted and received.

When the telephone is placed in the holdstate, since the handset 2 is placed on the hold handset cradle 33, the first and second contacts 29a, 29b of the hold switch 29 are switched to the "disconnection" state. In this state, the dial pulse signal DP is not supplied to the base of the second transistor 50b of the network line switch 50 and therefore the network line switch 50 is set in the "disconnection" state. However, the automatic hold and release detecting circuit 59 (detector 46) detects that the handset 2 is placed on the hold handset cradle 33 and that the dial pulse signal DP is not supplied. Then, the automatic hold and release detecting circuit 59 biases the second transistor 50b and retains or switches the network line switch 50 to the "connection" state. Therefore, the hold state is continued. Furthermore, the hold sound generator 60 may be arranged in such a way as to generate a hold sound when the second contact 29b of the hold switch 29 is connected to the "disconnection" state.

Figure 11B:
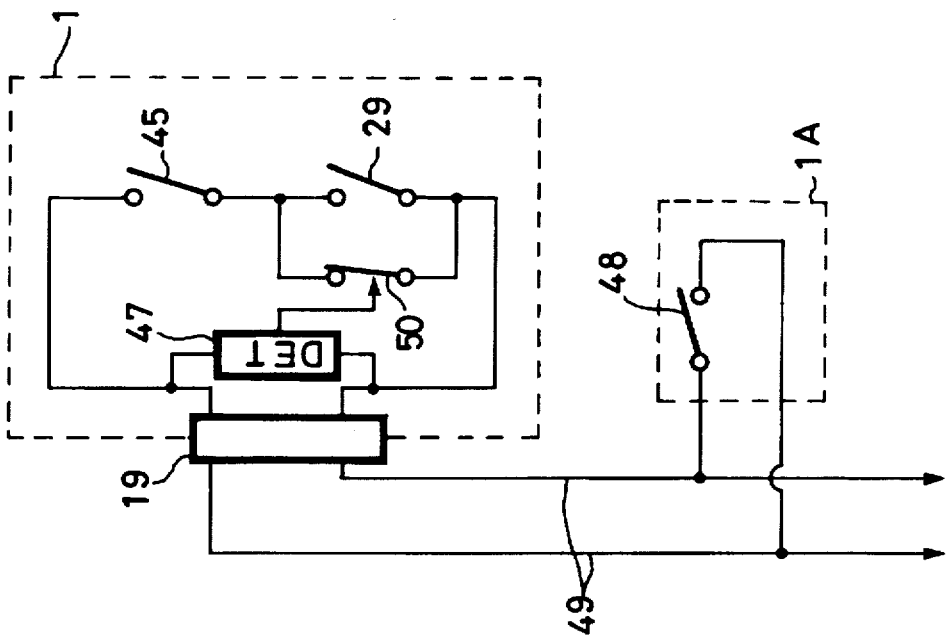

Furthermore, the hold state can automatically be released when the voltage detecting circuit 47 (FIGS 11a and 11B) serving as the automatic hold and release detecting circuit detects that the telephone 1A connected is paralled to the extension shown in FIGS. 11A, 11B and the second transistor 50b is disabled and the network line switch 50 is switched to the "disconnection" state.

While the wall key telephone has been described so far, the present invention is not limited thereto and may be applied to a desk key telephone. In a key telephone which incorporates a CPU (central processing unit) or the like, it is possible to control the network line switch 50 by supplying the CPU with data, such as the hook detected signal and the voltage of the voltage drop or the like.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A telephone comprising:
   a telephone body including a front surface and a rear surface said rear surface, attached to a wall surface;
   a handset;
   a telephone network line hold means activated in response to a detected signal and for placing said telephone in a hold state or for releasing said telephone from said hold state, said telephone network line hold means including a detection means for detecting whether or not said handset is disposed on said telephone body at a position in which said telephone network line hold means is to be activated and for providing said detected signal; and
   engagement means for preventing said handset from being dropped from said telephone body when said handset is disposed in the position in which said telephone network line hold means is activated, said engagement means including
      a first engagement surface portion formed in said front surface and disposed substantially perpendicular to said wall surface and being contactable with a first portion of said handset, and
      a second engagement surface portion formed in said front surface and inclined towards said wall surface and being contactable with a second portion of said handset,
   whereby when said first portion of said handset is in contact with said first engagement surface portion and said second portion of said handset is in contact with said second engagement surface portion, said handset is inclined toward said wall surface and is prevented from being dropped from said telephone body.

2. The telephone according to claim 1, wherein said detection means comprises a magnetic generating portion disposed on either said handset or said telephone body and magnetic sensor means disposed on the other one of said handset or said telephone body.

3. The telephone according to claim 1, wherein said detection means comprises a magnet disposed on either said handset or said telephone body and a magnetic sensor disposed on the other one of said handset or said telephone body.

4. The telephone according to claim 1, wherein said detection means comprises a detection switch disposed on said telephone body or said handset.

5. The telephone according to claim 1, wherein said engagement means comprises an engagement projection disposed on either said handset or said telephone body and further comprising an engagement concave portion defined in the other one of said telephone body and said handset.

6. The telephone according to claim 1, wherein said detection means comprises a detection switch disposed on said telephone body or said handset, said detection switch having an operation portion projecting therefrom and wherein said detection means further comprises a concave portion defined in the other of said telephone body and said handset, for engaging said operation portion in order to provide said detected signal.

7. The telephone according to claim 6, wherein said operation portion has a predetermined dimension along a first direction, and wherein said concave portion has, along said first direction, a depth which is smaller than said predetermined dimension of said operation portion.

8. A telephone comprising:
   a telephone body including a front surface and a rear surface, said rear surface attached to a wall surface, and a hold handset cradle formed in said front surface;
   a handset;
   telephone network line hold means activated in response to a detected signal and for placing said telephone in a hold state or for releasing said telephone from said hold state, said telephone network line hold means including a detection means for detecting whether or not said handset is disposed on said telephone body at a position in which said telephone network line hold means is to be activated and for providing said detected signal, said detection means being disposed within said hold handset cradle; and engagement means for preventing said handset from being dropped from said telephone body when said handset is disposed in the position in which said telephone network line hold means is activated, said engagement means including
- a first engagement surface portion formed in said hold handset cradle and disposed substantially perpendicular to said wall surface and being contactable with a first portion of said handset, and
- a second engagement surface portion formed in said hold handset cradle and inclined towards said wall surface and being contactable with a second portion of said handset, whereby when said first portion of said handset is engaged in said hold handset cradle, said first portion of said handset is in contact with said first engagement surface portion and said second portion of said handset is in contact with said second engagement surface portion, and said handset is inclined toward said wall surface and is prevented from being dropped from said telephone body.

9. The telephone according to claim 8, wherein said detection means comprises a magnetic generating portion disposed on either said handset or said telephone body and further comprising magnetic sensor means disposed on the other one of said handset or said telephone body.

10. The telephone according to claim 8, further comprising engagement means for preventing said handset from being dropped from said telephone body when said handset is placed in the position in which said telephone network line hold means is activated.

11. The telephone according to claim 10, wherein said engagement means comprises an engagement projection disposed on said handset or said hold handset cradle and further comprising an engagement concave portion defined in the other one of said telephone body and said handset.

12. The telephone according to claim 8, wherein said detection means comprises a detection switch disposed on said telephone body or said handset, said detection switch having an operation portion projecting therefrom and wherein said detection means further comprises a concave portion defined in the other of said telephone body and said handset, for engaging said operation portion in order to provide said detected signal.

13. The telephone according to claim 12, wherein said operation portion has a predetermined dimension along a first direction and wherein said concave portion has, along said first direction, a depth which is smaller than said predetermined dimension of said operation portion.

\* \* \* \* \*